US010885760B2

(12) United States Patent
Momin

(10) Patent No.: US 10,885,760 B2
(45) Date of Patent: Jan. 5, 2021

(54) CHILD SAFETY SYSTEM

(71) Applicant: Missam Momin, Lawrenceville, GA (US)

(72) Inventor: Missam Momin, Lawrenceville, GA (US)

( * ) Notice: Subject to any disclaimer, the term of this patent is extended or adjusted under 35 U.S.C. 154(b) by 0 days.

(21) Appl. No.: 15/686,127

(22) Filed: Aug. 24, 2017

(65) Prior Publication Data
US 2020/0066128 A1 Feb. 27, 2020

(51) Int. Cl.
G08B 21/02 (2006.01)
H04B 17/318 (2015.01)
H04W 4/14 (2009.01)
H04B 1/034 (2006.01)
H04W 88/02 (2009.01)

(52) U.S. Cl.
CPC ...... *G08B 21/0211* (2013.01); *G08B 21/0216* (2013.01); *G08B 21/0236* (2013.01); *G08B 21/0266* (2013.01); *G08B 21/0277* (2013.01); *H04B 17/318* (2015.01); *H04W 4/14* (2013.01); *H04B 1/0343* (2013.01); *H04W 88/02* (2013.01)

(58) Field of Classification Search
CPC ............ G08B 21/0211; G08B 21/0266; G08B 21/0277; G08B 21/0216; G08B 21/0236; H04B 17/318; H04W 4/14; B60N 2/002
See application file for complete search history.

(56) References Cited

U.S. PATENT DOCUMENTS

| | | | |
|---|---|---|---|
| 8,063,788 B1* | 11/2011 | Morningstar | B60N 2/002 180/271 |
| 9,682,638 B1* | 6/2017 | McCurdy | G08B 21/22 |
| 2009/0079557 A1* | 3/2009 | Miner | G08B 21/0269 340/457.1 |
| 2016/0247378 A1* | 8/2016 | Baczuk | H04W 4/70 |
| 2017/0106789 A1* | 4/2017 | Holdbrook-Smith | G08B 21/24 |
| 2018/0096578 A1* | 4/2018 | Mattarocci | G08B 21/0277 |

* cited by examiner

*Primary Examiner* — Munear T Akki
(74) *Attorney, Agent, or Firm* — Charlena Thorpe, Esq.; Incorporating Innovation LLC

(57) ABSTRACT

Implementations of a child safety system is provided. Implementations of a child safety system comprises portable transmitter configured to transmits a wireless signal compatible with Bluetooth technology and a portable computing device configured to receive the wireless signal and compute a distance between the portable computing device and the transmitter based on the signal strength of the wireless signal received. The portable computing device further is configured to sound an alarm on the portable computing device once the distance between the portable computing device and the portable transmitter equals or exceeds a preset distance.

10 Claims, 5 Drawing Sheets

CHILD SAFETY SYSTEM

TECHNICAL FIELD

This disclosure relates to implementations of a child safety system.

BACKGROUND

There have been incidents when a child has been left in the back seat of a car inadvertently. This happens when a child care provider forgets that a child is in the back seat and leaves the child unattended in the car. This can be dangerous when temperatures outdoors are extreme. Existing systems designed to alert a care giver of a child left behind in a car, such as the system disclosed in U.S. Patent Appl. Pub. No. 2012/0232749 and 2015/0274036, are complicated and require that the systems first detect whether a child is actually in the car. These systems also are not portable in that they cannot be easily used in any vehicle by simply moving the system from one vehicle to another vehicle. Furthermore, some systems use infrared signals, which require more hardware.

DETAILED DESCRIPTION

Figure 1:
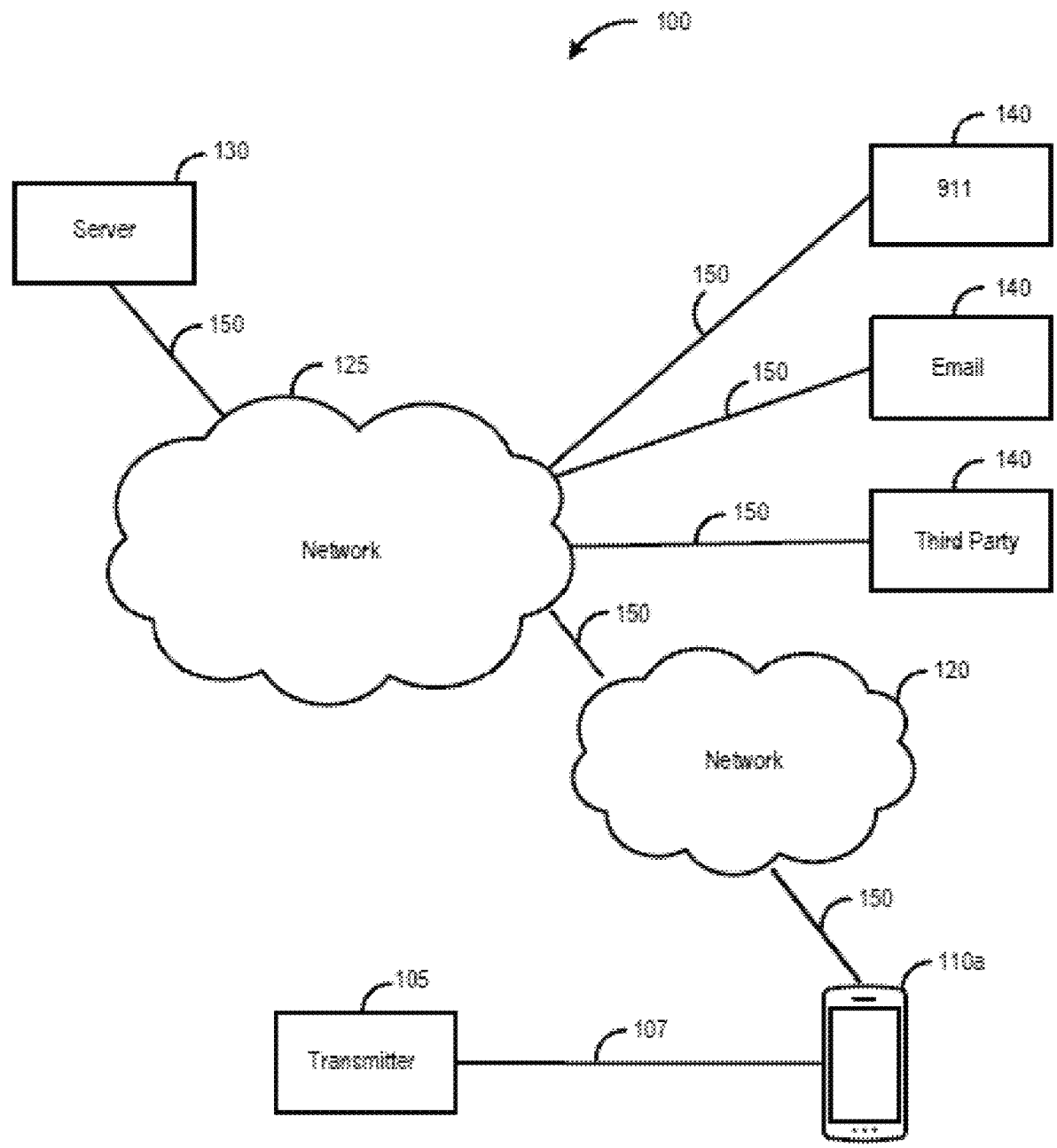
FIG. 1 illustrates an example environment of a child safety system according to an implementation of the present disclosure.

Implementations of a child safety system are provided. In some implementations, the child safety system comprises a transmitter and a portable computing device. In some implementations, the transmitter is configured to transmits a wireless signal. In some implementations, the portable computing device is configured to receive the wireless signal from the transmitter and compute the distance between the portable computing device and the transmitter based on the signal strength of the wireless signal received. In some implementations, the portable computing device is configured to sound an alarm on the portable computing device once the distance between the portable computing device and the transmitter reaches a maximum distance.

In this way, a user can place the transmitter inside a car that transports a child. In some implementations, the transmitter can be placed on or near a child car seat. In some implementations, the transmitter can be placed on the back seat. In some implementations, the transmitter can be placed anywhere in a vehicle. In some implementations, a user may place one, two, three, or more transmitters inside a car that transports a child. In some implementations, each transmitter is placed about a car seat. When the portable computing device, moves away from the transmitter (e.g., when a child care provider leaves the immediate area of the car with the portable computing device), the portable computing device can alert the child care provider. This alert can remind the child care provider of any child in the car.

In some implementations, the transmitter may be a small, portable beacon. In some implementations, the transmitter may have an IP address. In some implementations, the transmitter may include a temperature sensor. In some implementations, the transmitter may be configured to interface with a car computer system. In some implementations, the transmitter may be configured to interface with a car alarm.

As discussed above, in some implementations, the transmitter transmits a wireless signal to the mobile phone. In some implementations, the transmitter transmits a wireless signal via bluetooth technology to the mobile phone. In some implementations, the transmitter transmits radio waves. In some implementations, the transmitter transmits ultra high frequency radio waves. In some implementations, the transmitter ultra high frequency radio waves in the range between 2.4 to 2.485 GHz. In some implementations, the transmitter ultra high frequency radio waves in the range between 300 MHz and 3 GHz.

As discussed above, in some implementations, the portable computing device is configured to sound an alarm on the portable computing device once the computed distance between the portable computing device and the transmitter reaches a maximum distance. In some implementations, the maximum distance may be predetermined. In some implementations, the maximum distance may be set by the user. In some implementations, the maximum distance may be set by the user via the portable computing device.

In some implementations, the portable computing device computes the distance between the portable computing device and the transmitter based on the signal strength received. In some implementations, the signal strength is based on a received signal strength indicator (RSSI) measurement. In some implementations, the signal strength may be based on any other measurement. In some implementations, the signal strength is not based on a Global Positioning System (GPS).

In some implementations, if the alarm is not acknowledged by the user, a secondary alert may be sent. In some implementations, a user may acknowledge the alarm by providing an input to the portable computing device. In some implementations, the secondary alert may be sent to a separate computing device or any other receiving device. In some implementations, the secondary alert may be sent to a third party. In some implementations, the secondary alert may be sent over a network to a computing device. In some implementations, the secondary alert may be an email. In some implementations, the secondary alert may be a text message (e.g., a SMS or MMS message). In some implementations, the secondary alert may be a telephone call. In some implementations, the secondary alert may be sent to an emergency agency such as 911, police, or fire department. In some implementations, the secondary alert may include the location of the transmitter. In some implementations, the secondary alert may be set by the user.

In some implementations, the portable computing device may be configured to search for any nearby transmitters. In some implementations, the portable computing device may be configured to search for one or more transmitters. In some implementations, the portable computing device may be configured to search for one or more transmitters no more than 5 meters of the portable computing device. In some implementations, the portable computing device may be configured to search for one or more transmitters more than 5 meters of the portable computing device. In some implementations, a user may input a distance (such as the length and/or width of the car), and the, the portable computing device may be configured to search for one or more transmitters no more than the inputted distance from the device.

In some implementations, the portable computing device may be configured to sync with the transmitter. In some implementations, the portable computing device may search for transmitter via Bluetooth.

In an alternative implementation, the transmitter may be a pre-existing wearable device (e.g., Fitbit®) that includes a heartbeat sensor. In some implementations, the portable computing device is configured to receive the wireless signal containing heartbeat information. In some implementations, the portable computing device is configured to compute the distance between the portable computing device and the transmitter based on the signal strength of the wireless signal received from the wearable device.

FIG. 1 illustrates an example environment 100 of a child safety system according to an implementation of the present disclosure.

As shown in FIG. 1, in some implementations, the environment 100 may include a transmitter 105, a client device 110, a link 107, a wireless cellular network 120, a network 125, a website 130, and/or one or more third party computing devices 140.

In some implementations, the transmitter 105 may be a small, portable beacon. In some implementation, the transmitter may be 1.25" (width)×1.25" (length). In some implementations, the transmitter is smaller. In some implementations, the transmitter is larger.

In some implementations, the transmitter 105 is configured to transmits a wireless signal. In some implementations, the transmitter transmits a wireless signal via bluetooth technology to the mobile phone. In some implementations, the transmitter transmits radio waves. In some implementations, the transmitter transmits ultra high frequency radio waves. In some implementations, the transmitter ultra high frequency radio waves in the range between 2.4 to 2.485 GHz. In some implementations, the transmitter ultra high frequency radio waves in the range between 300 MHz and 3 GHz.

In some implementations, the transmitter 105 may have an IP address. In some implementations, the transmitter 105 may include a temperature sensor. In some implementations, the transmitter 105 may be configured to interface with a car computer system. In some implementations, the transmitter 105 may be configured to interface with a car alarm.

The client device 110 is depicted as a mobile phone, but client device 110 may comprise any type of portable computing device, such as a laptop, cellular phone, a smart device, a mobile telephone, a tablet-style computer, or any other handheld electronic device capable of wireless communication.

In some implementations, the portable computing device 110 includes hardware, software, or embedded logic components or a combination of two or more such components and configured to carry out the appropriate functions implemented or supported by the portable computing device 110. In some implementations, the portable computing device 110 is configure to access networks 120, 125. In some implementations, the portable computing device 110 is configured to communicate with a third party computing device 140.

In some implementations, the portable computing device 110 may include one or more processors, one or more memories, one or more displays, one or more interfaces, one or more components capable of inputting data, one or more components capable of outputting data, one or more components capable of communicating with any other component of the child safety system environment 100, or any other component suitable for a particular purpose.

In some implementations, the portable computing device 110 is configured to interact with the transmitter 105, third party computing devices 140, and the server 140 via an application, such as a native application, residing on the portable computing device 110.

A link 107 may couple the portable computing device 110 to the transmitter 105. In some implementations, the link 107 may include a personal area network (PAN) (such as BLUETOOTH). In some implementations, the link 107 may include any suitable link coupling the portable computing device 110 to the transmitter 105.

In some implementations, the portable computing device 110 is configured to receive the wireless signal from the transmitter 105 and compute the distance between the portable computing device 110 and the transmitter 105 based on the signal strength of the wireless signal received. In some implementations, the portable computing device 110 is configured to sound an alarm on the portable computing device 110 once the computed distance between the portable computing device 110 and the transmitter 105 reaches a maximum distance.

In some implementations, the maximum distance may be predetermined. In some implementations, the maximum distance may be set by the user. In some implementations, the maximum distance may be set by the user via the portable computing device.

In some implementations, the portable computing device 110 computes the distance between the portable computing device 110 and the transmitter 105 based on the signal strength received. In some implementations, the signal strength is based on a received signal strength indicator (RSSI) measurement. In some implementations, the signal strength may be based on any other measurement. In some implementations, the signal strength is not based a Global Positioning System (GPS).

In an alternative implementation, the transmitter 105 may be a pre-existing wearable device (e.g., Fitbit®) that includes a heartbeat sensor. In some implementations, the portable computing device 110 is configured to receive the wireless signal containing heartbeat information. In some implementations, the portable computing device 110 is configured to compute the distance between the portable computing device and the transmitter based on the signal strength of the wireless signal received from the wearable device.

In some implementations, the portable computing device 110 may be configured to search for any nearby transmitters. In some implementations, the portable computing device may be configured to sync with the transmitter 105.

In some implementations, the client device 110 can connect to the network 125 through a wireless cellular network 120, such as GPRS-based and CDMA-based wireless networks, as well as 802.16 WiMax and long-range wireless data networks.

In some implementations, components of the child safety system environment 100 may communicate with any other component of the environment 100 over network 125. Network 125 may be any suitable network. In some implementations, for example, one or more portions of network 125 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another network 125, or a combination of two or more of the foregoing.

In some embodiments, components of the child safety system environment 100 may be configured to communicate over links 150. Links 150 may connect components of the environment 100 to networks 120, 125 or to each other. In some implementations, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links 150. Links 150 may not be the same throughout the environment 100.

In some implementations, if the alarm is not acknowledged by the user, a secondary alert may be sent. In some implementations, a user may acknowledge the alarm by providing an input to the portable computing device 110. In some implementations, the secondary alert may be sent to a third party 140.

In some implementations, the secondary alert may be sent over network 120, 125 and/or links 150 to a third party 140. In some implementations, a third party 140 may be any type of computing device, such as a desktop computer system, a laptop, a smartphone, a mobile telephone, a tablet-style computer, any other handheld electronic device, or any other device capable of wireless or wired communication.

In some implementations, the secondary alert may be an email. In some implementations, the secondary alert may be a text message. In some implementations, the secondary alert may be a phone call. In some implementations, the secondary alert may be a phone call to the portable computing device 110. In some implementations, the secondary alert may be sent to an emergency agency such as 911. In some implementations, the secondary alert may include the location of the transmitter 105. In some implementations, the secondary alert may be set by the user.

The server 140 may include a processor, memory, user accounts, and one or more modules to perform various functions.

Figure 3A:
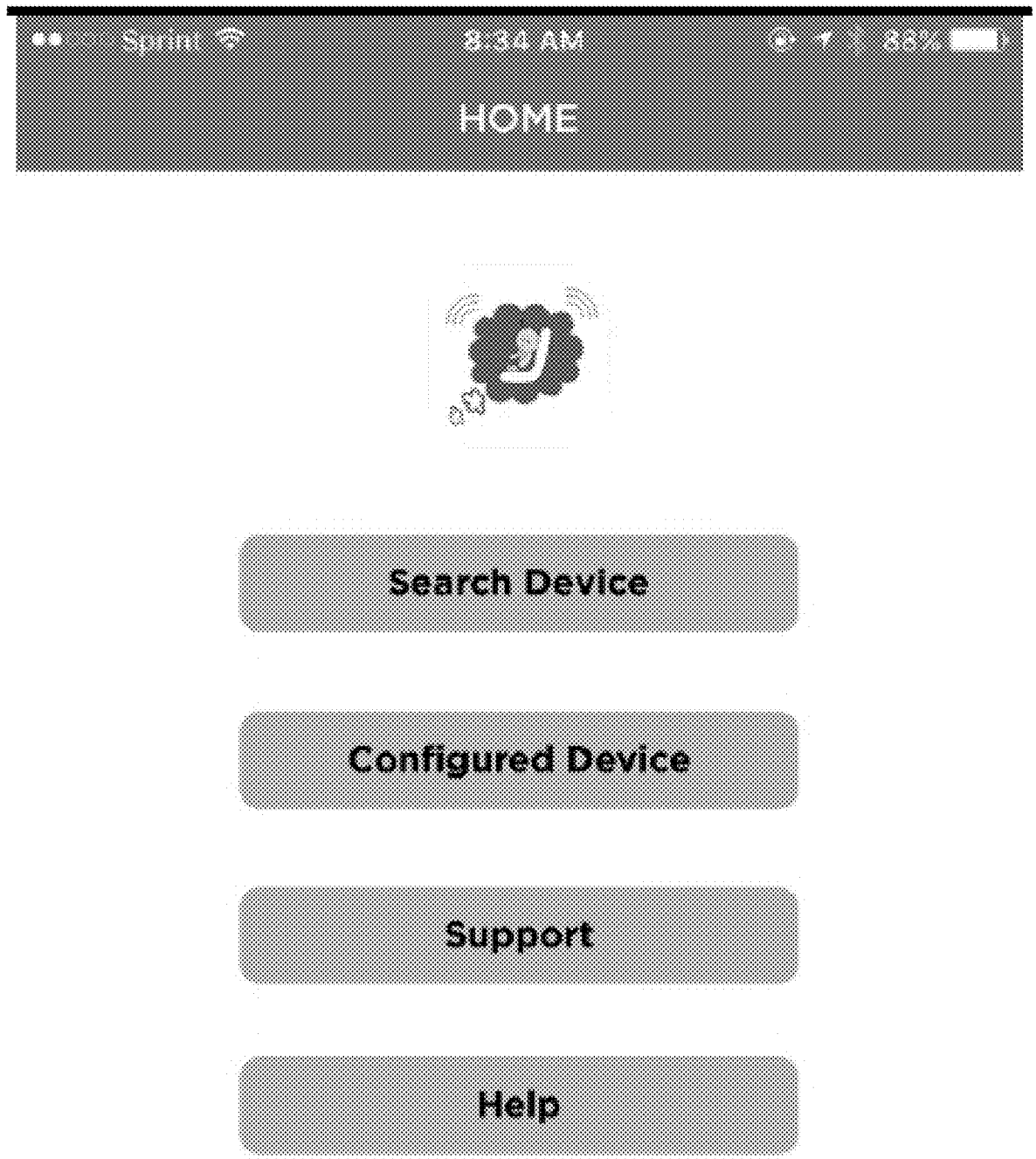
FIGS. 3A-3C illustrate example user interfaces for the child safety system according to an implementation of the present invention.
Figure 3B:
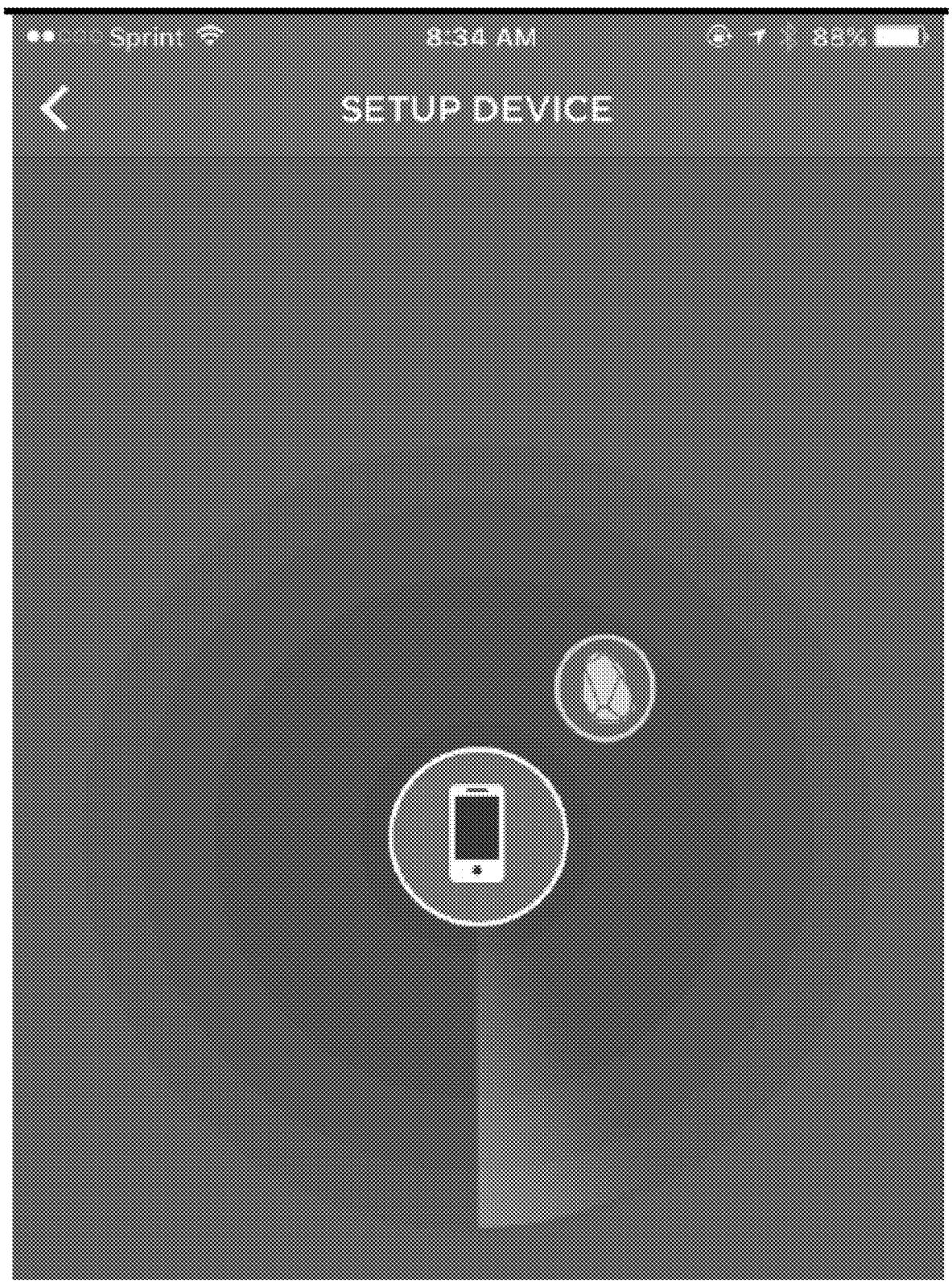
Figure 3C:
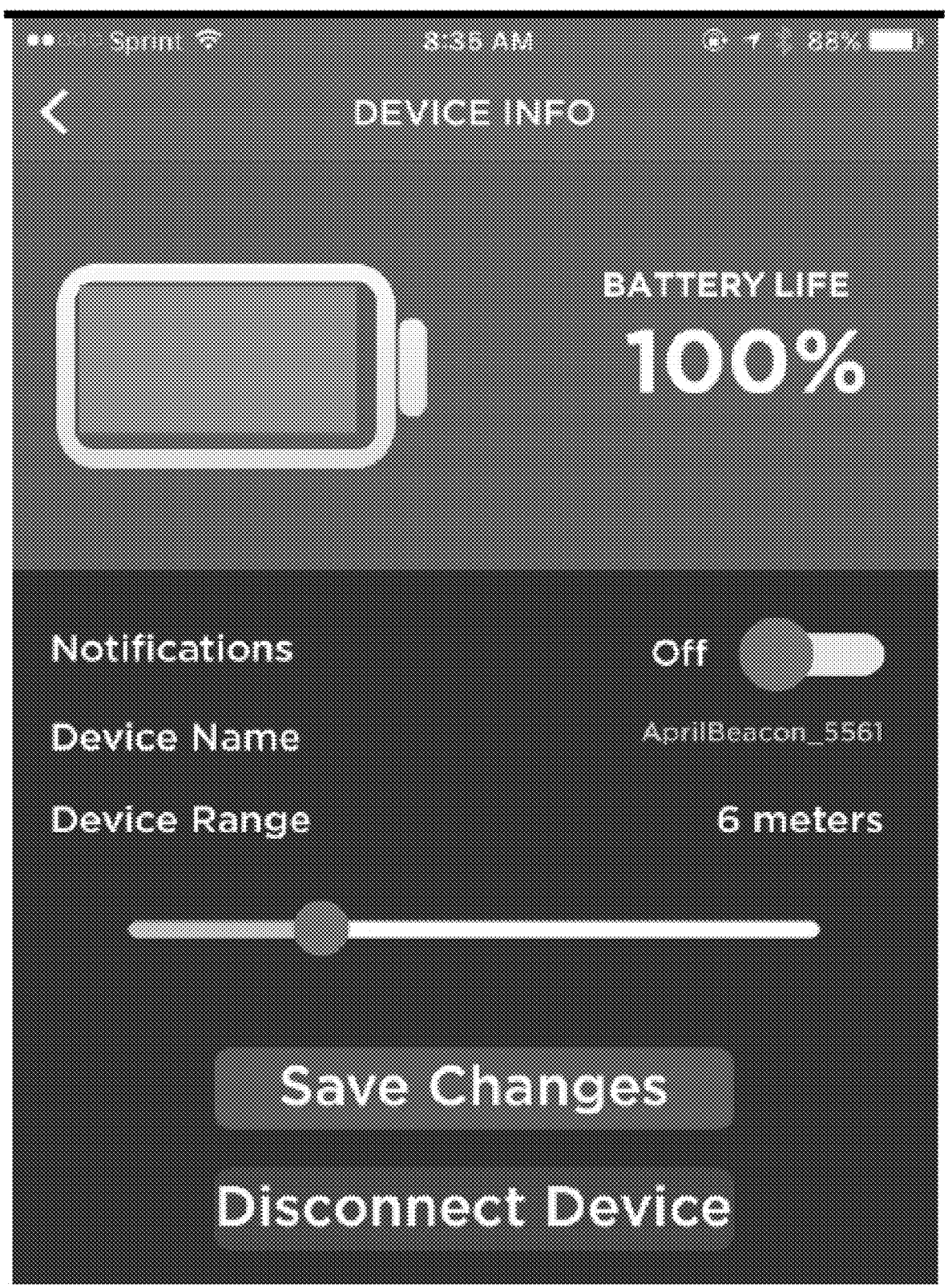

FIGS. 3A-3C illustrate example user interfaces for the child safety system according to an implementation of the present invention. The user interfaces 300a-b may be rendered by an application residing on the portable computing device 110.

FIG. 3A illustrates an example home pages. In some implementations, a user may search for any nearby transmitters by pressing the "Service Device" menu. FIG. 3B illustrates an example user interface when the portable computing device 110 searches for a nearby transmitter. As shown in FIG. 3C, in some implementations, when the user selects the "Configured Device" menu, the user may set the maximum distance discussed above. In some implementations, the user may also turn the application on and off.

Figure 2:
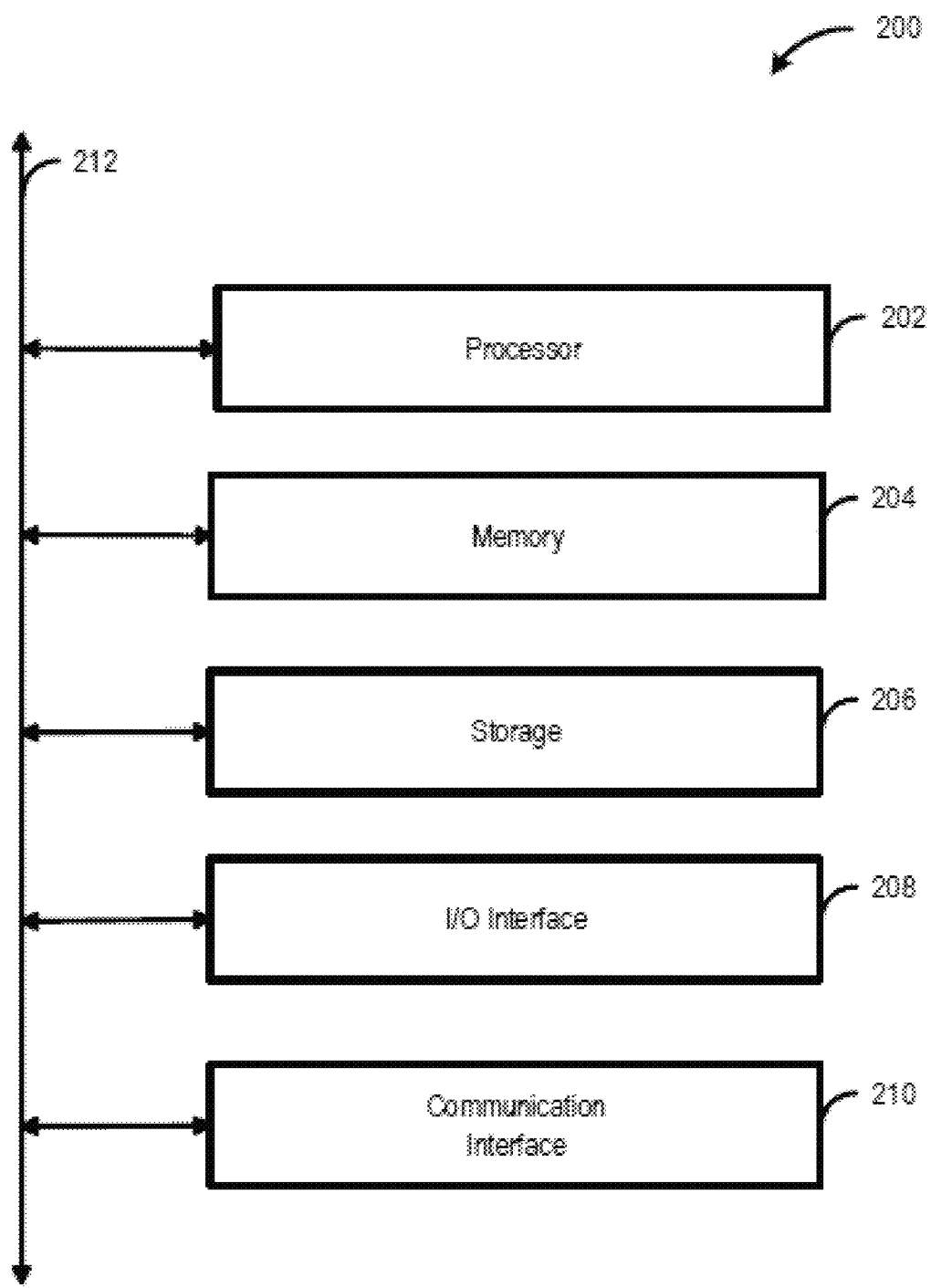
FIG. 2 illustrates an example computer system, which may be used with implementations of the present invention.

FIG. 2 illustrates an example computer system 200, which may be used with some implementations of the present invention. This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these. Where appropriate, computer system 200 may include one or more computer systems 200; be unitary or distributed; span multiple locations; span multiple machines; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In some implementations, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In some implementations, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In some implementations, processor 202 may include one or more internal caches for data, instructions, or addresses. The present disclosure contemplates processor 202 including any suitable number of any suitable internal caches, where appropriate. As an example and not by way of limitation, processor 202 may include one or more instruction caches, one or more data caches, and one or more translation look-aside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In some implementations, processor 202 may include one or more internal registers for data, instructions, or addresses. The present disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In some implementations, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In some implementations, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In some implementations, one or more memory management units (MMUs) reside between processor 202 and memory 204 and facilitate accesses to memory 204 requested by processor 202. In some implementations, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 204 may include one or more memories 204, where appropriate. Although this disclosure describes and illustrates particular memory, this disclosure contemplates any suitable memory.

In some implementations, storage 206 includes mass storage for data or instructions. As an example and not by way of limitation, storage 206 may include an HDD, a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In some implementations, storage 206 is non-volatile, solid-state memory. In some implementations, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In some implementations, I/O interface 208 includes hardware, software, or both providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In some implementations, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In some implementations, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 402 (such as, for example, one or more internal registers or caches), one or more portions of memory 404, one or more portions of storage 406, or a combination of these, where appropriate. In some implementations, a computer-readable storage medium implements RAM or ROM. In some implementations, a computer-readable storage medium implements volatile or persistent memory. In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In some implementations, software includes one or more application programming interfaces (APIs). This disclosure contemplates any suitable software written or otherwise expressed in any suitable programming language or combination of programming languages. In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code). In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website. Any computer-based system that provides networking functionality can be used in accordance with the present invention even if it relies, for example, on email, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The invention claimed is:

1. A child safety system comprising:
   a transmitter that is placed in a vehicle configured to transmit a wireless signal wherein the wireless signal is a radio wave compatible with Bluetooth technology and wherein the transmitter is a wearable device that includes a heartbeat sensor; and
   a portable computing device configured to search for and sync with the transmitter, receive the wireless signal from the transmitter and, compute a distance between the portable computing device and the transmitter based on the signal strength of the wireless signal received wherein the portable computing device is a smart phone and wherein based on the movement of the portable computing device away from the transmitter, the portable computing device further is configured to sound an alarm on the portable computing device when the distance computed between the portable computing device and the transmitter, equals or exceeds a preset distance,
   wherein the portable computing device is configured to receive the preset distance set by a user of the portable computing device,
   wherein the portable computing device is configured to send an alert to a separate receiving device if the user of the portable computing device does not acknowledge the alarm by providing an input to the portable computing device, and
   wherein the alert includes the location of the transmitter.

2. The child safety system of claim 1 wherein the secondary alert is a text message.

3. The child safety system of claim 1 wherein the secondary alert is a telephone call.

4. The child safety system of claim 1 wherein the portable computing device is configured to receive the wireless signal containing heartbeat information and compute the distance between the portable computing device and the transmitter based on the signal strength of the wireless signal received from the wearable device.

5. A method comprising:
   providing a transmitter in a vehicle that transmits a wireless signal wherein the wireless signal is a radio wave compatible with Bluetooth technology wherein the transmitter is a wearable device that includes a heartbeat sensor;
   providing a portable computing device wherein the portable computing device searches for the transmitter and syncs the portable computing device with the transmitter wherein the portable computing device is a smart phone;
   moving the portable computing device away from the transmitter while receiving at the portable computing device the wireless signal from the transmitter;
   receiving on the portable computing device a maximum distance from a user of the portable computing device;
   computing on the portable computing device a distance based on the signal strength of the wireless signal received;
   sounding an alarm on the portable computing device when the computed distance equals or exceeds the maximum distance to alert the user of a child in the vehicle; and
   sending an alert if the user does not acknowledge the alarm by providing an input to the portable computing device wherein the alert includes the location of the transmitter.

6. The computer-implemented method of claim 5 wherein the secondary alert is a text message.

7. The computer-implemented method of claim 5 wherein the secondary alert is a telephone call.

8. The computer-implemented method of claim 5, the wireless signal comprises information from a heartbeat sensor of a wearable device.

9. A child safety system comprising:
   a transmitter that is placed in a vehicle configured to transmits a wireless signal wherein the wireless signal is a radio wave compatible with Bluetooth technology and wherein the transmitter is a wearable device that includes a heartbeat sensor; and
   a portable computing device configured to search for and sync with the transmitter, receive the wireless signal from the transmitter, and compute a distance between the portable computing device and the transmitter based on the signal strength of the wireless signal received wherein the portable computing device is a smart phone,
   wherein based on the movement of the portable computing device away from the transmitter, the portable computing device is configured to sound an alarm on the portable computing device when the distance computed between the portable computing device and the transmitter equals or exceeds a preset distance,
   wherein the portable computing device is configured to receive the preset distance set by a user of the portable computing device,
   wherein the portable computing device is configured to send an alert to a separate receiving device if the user of the portable computing device does not acknowledge the alarm by providing an input to the portable computing device, and
   wherein the alert includes the location of the transmitter.

10. The child safety system of claim 9 wherein the alert is a text message or telephone call.

* * * * *